US008729458B2

(12) United States Patent
Kato (10) Patent No.: US 8,729,458 B2
(45) Date of Patent: May 20, 2014

(54) ENCODER (75) Inventor: Yoshiaki Kato, Kawasaki (JP)

(73) Assignee: Mitutoyo Corporation, Kawasaki (JP)

(*) Notice: Subject to any disclaimer, the term of this patent is extended or adjusted under 35 U.S.C. 154(b) by 197 days.

(21) Appl. No.: 13/253,267

(22) Filed: Oct. 5, 2011

(65) Prior Publication Data

US 2012/0085897 A1 Apr. 12, 2012

(30) Foreign Application Priority Data

Oct. 8, 2010 (JP) ................. 2010-228310

(51) Int. Cl.
G01D 5/347 (2006.01)
G01D 5/36 (2006.01)

(52) U.S. Cl.
USPC .............. 250/231.1; 250/231.16; 356/619; 33/707

(58) Field of Classification Search
USPC .......... 250/216, 229, 231.1, 231.13–231.18, 250/237 G, 237 R; 356/614–619; 33/700, 33/706, 707
See application file for complete search history.

(56) References Cited

U.S. PATENT DOCUMENTS

| 4,360,730 | A | * | 11/1982 | Breslow | 250/231.13 |
|---|---|---|---|---|---|
| 4,445,110 | A | * | 4/1984 | Breslow | 341/10 |
| 4,465,928 | A | * | 8/1984 | Breslow | 250/231.18 |
| 4,786,891 | A | * | 11/1988 | Ueda et al. | 341/13 |
| 4,990,767 | A | * | 2/1991 | Ernst et al. | 250/231.16 |
| 5,267,012 | A | * | 11/1993 | Sasnett et al. | 356/121 |
| 5,502,311 | A | * | 3/1996 | Imai et al. | 250/548 |
| 5,668,331 | A | * | 9/1997 | Schintag et al. | 73/865.9 |
| 5,754,568 | A | * | 5/1998 | Braasch | 714/799 |
| 6,384,752 | B1 | * | 5/2002 | Suzuki et al. | 341/111 |
| 6,528,783 | B1 | * | 3/2003 | Mortara et al. | 250/231.13 |
| 7,123,027 | B2 | * | 10/2006 | Tola et al. | 324/662 |
| 7,268,341 | B2 | * | 9/2007 | Lehoty et al. | 250/221 |
| 8,330,943 | B2 | * | 12/2012 | Hane et al. | 356/5.1 |
| 2004/0135077 | A1 | * | 7/2004 | Hane | 250/231.13 |
| 2005/0258346 | A1 | * | 11/2005 | LeHoty et al. | 250/221 |
| 2006/0091301 | A1 | * | 5/2006 | Trisnadi et al. | 250/226 |
| 2007/0187583 | A1 | * | 8/2007 | Yaku et al. | 250/231.13 |
| 2008/0315076 | A1 | * | 12/2008 | Kusano | 250/231.1 |
| 2010/0171029 | A1 | * | 7/2010 | Lee et al. | 250/231.1 |
| 2010/0214550 | A1 | * | 8/2010 | Hulsebos et al. | 355/74 |
| 2012/0085897 | A1 | * | 4/2012 | Kato | 250/231.1 |

FOREIGN PATENT DOCUMENTS

| EP | 0 302 194 A2 | 2/1989 |
|---|---|---|
| EP | 0 789 226 A1 | 8/1997 |
| EP | 1 821 075 A2 | 8/2007 |
| EP | 2 006 642 A2 | 12/2008 |
| JP | 09-229717 | 9/1997 |
| JP | 2003-065803 | 3/2003 |
| JP | 2009-002702 | 1/2009 |

* cited by examiner

Primary Examiner — John Lee
(74) Attorney, Agent, or Firm — Rankin, Hill & Clark LLP (57) ABSTRACT A detection head includes a plurality of detection array portions that are arranged in a direction along which the head is relatively displaceable. Position signals indicating a position of the detection head are calculated from output signals output from the detection array portions. In order to combine the position signals with one another and determine the position of the detection head with respect to the scale, weighting according to a level of the output signal is performed on the position signal of each of the detection array portions, and the weighted position signals are averaged.

4 Claims, 6 Drawing Sheets

ENCODER

CROSS REFERENCE TO RELATED APPLICATION(S)

This application is based upon and claims the benefit of priority from Japanese Patent Application No. 2010-228310 filed on Oct. 8, 2010, the entire contents of which are incorporated herein by reference.

TECHNICAL FIELD

The present invention relates to an encoder including a scale and a detection head which is relatively displaceable with respect to the scale.

RELATED ART

An encoder including a scale and a detection head which is relatively displaceable with respect to the scale is used for accurately performing position control on a controlling machine to which the encoder is attached. A photoelectric encoder will be exemplarily described. When contamination, dirt, dust, damages, or the like (hereinafter, generally referred to as contamination or the like) which may block light adheres to a scale, the signal detection efficiency of light receiving array portions arranged in a detection head is reduced, and an error occurs in a position signal indicating the position of the detection head. Therefore, a technique is employed in which the detection area on the scale where detection is performed by the detection head is widened to reduce the percentage of the area to which dirt adheres, in the detection area, thereby lowering the rate of the reduction of the signal detection efficiency. Alternatively, as disclosed in Patent References 1 and 2, a technique is employed in which an error determination is performed on signals output from light receiving array portions in an area to which dirt adheres, and, if there is an error, the corresponding output signal is eliminated, thereby lowering the rate of the reduction of the signal detection efficiency.

PRIOR ART REFERENCE

Patent Reference

[Patent Reference 1] JP-A-9-229717
[Patent Reference 2] JP-A-2003-65803

In these techniques, in order to ensure a certain degree of signal detection efficiency, however, the detection head must be elongated in the displaceable direction so as to include a larger number of light receiving array portions. In these techniques, namely, there is a possibility that the size of the detection head is increased.

When, in the scale, the area to which dirt adheres is wide, for example, there may arise a situation where many of the signals output from the light receiving array portions are lower in level than a threshold which is provided for the error determination. In such a situation, there is a possibility that all output signals are eliminated in a worse case, and positioning of the detection head with respect to the scale is impossible. In such a case, an operation of the controlling machine may frequently stop (hereinafter, generally referred to as error stop).

In a case where a pattern on the scale is formed by an integrated pattern in which an ABS pattern (absolute pattern) based on a pseudorandom code, and an INC pattern (incremental pattern) are integrated into one track as disclosed in JP-A-2009-2702 (FIG. 6), moreover, the output from the light receiving array portions is low in level in a portion where the patterns do not originally exist. In such a case, positioning of the detection head with respect to the scale is impossible irrespective of whether dirt exists or not, and therefore the above-described error stop easily occurs.

SUMMARY

Exemplary embodiments of the invention provide an encoder in which, even in the case where contamination or the like is on a scale, or the case where a pattern on the scale is formed by an integrated pattern configured by an ABS pattern and an INC pattern, reduction of the detection accuracy can be suppressed, a detection head can be maintained compact, and an error stop can be avoided in a controlling machine to which the encoder is attached.

An encoder according to an exemplary embodiment of the invention comprises:
  a scale; and
  a detection head which is relatively displaceable with respect to the scale,
    wherein the detection head includes
    a plurality of detection array portions that are arranged in a direction along which the detection head is relatively displaceable,
    a processor configured to calculate position signals indicating a position of the detection head from output signals output from the detection array portions, and to combine the position signals with one another and determine the position of the detection head with respect to the scale, and
    wherein the processor is configured to perform weighting according to a level of the output signal on the position signal of each of the detection array portions, and to average the weighted position signals.

In the encoder, the weighting on the position signal may be performed by setting a total sum of absolute values of differences of adjacent ones of signal strength data of the output signals output from individual detection elements constituting the detection array portions, or square values of the differences, as a coefficient of the position signal.

In the encoder, the weighting on the position signal may be performed by performing sinusoidal curve fitting on signal strength data of the output signals output from individual detection elements constituting the detection array portions, and setting a product of an amplitude of a sinusoidal wave obtained by the fitting, and an array width of the detection array portions, as a coefficient of the position signal.

In the encoder, the weighting on the position signal may be performed by setting a product of a diameter of a Lissajous waveform obtained from a two-phase sinusoidal signal which is the output signal, and an array width of the detection array portions, as a coefficient of the position signal.

According to the exemplary embodiment of the invention, even in the case where contamination or the like is on a scale, or the case where a pattern on the scale is formed by an integrated pattern configured by an ABS pattern and an INC pattern, reduction of the detection accuracy can be suppressed, a detection head of an encoder can be maintained compact, and an error stop can be avoided in a controlling machine to which the encoder is attached.

DETAILED DESCRIPTION

Hereinafter, an exemplary embodiment of the invention will be described in detail with reference to the accompanying drawings.

Figure 1:
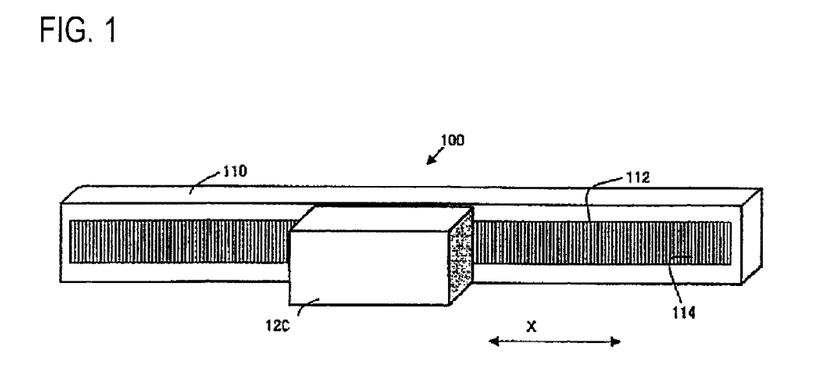
FIG. 1 is a view schematically showing an encoder according to first to third embodiments of the invention.
Figure 2A:
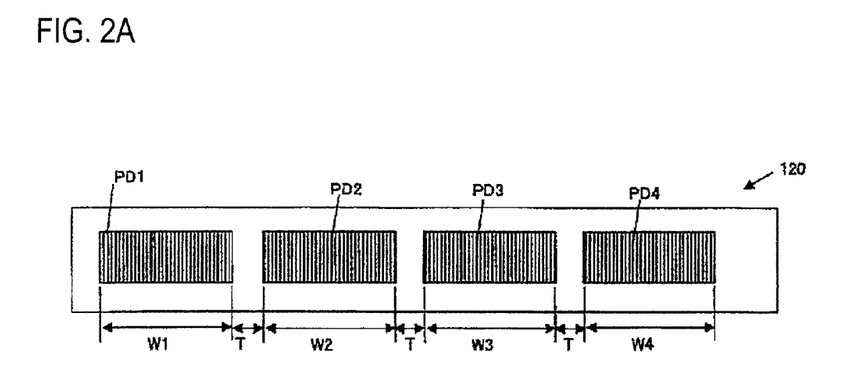
FIG. 2A is a view showing a detection head shown in FIG. 1.
Figure 2B:
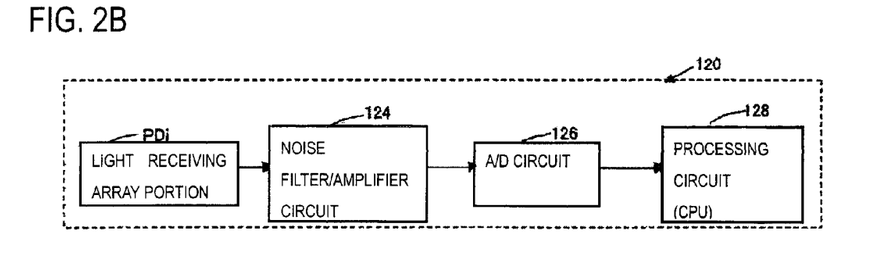
FIG. 2B is a block diagram of the detection head shown in FIG. 1.
Figure 3A:
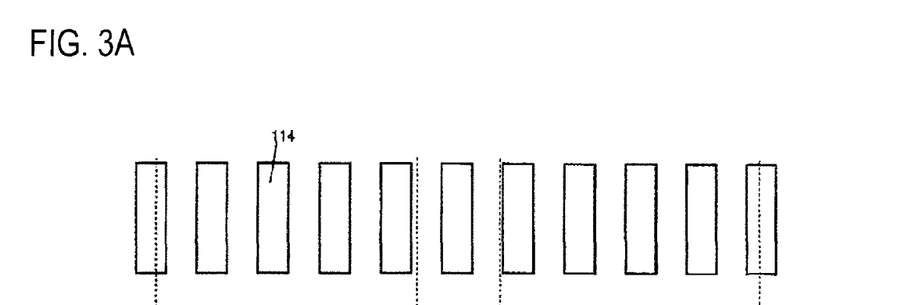
FIGS. 3A to 3C are views showing a relationship between light receiving array portions of the detection head and output signals.
Figure 3B:
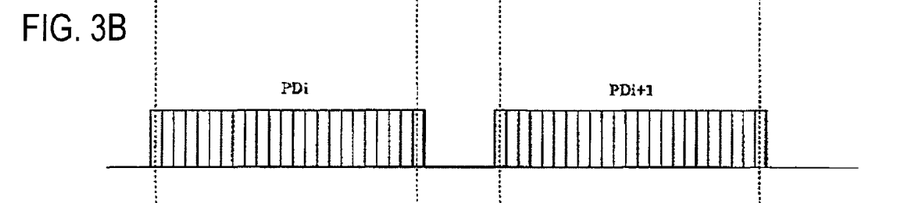
Figure 3C:
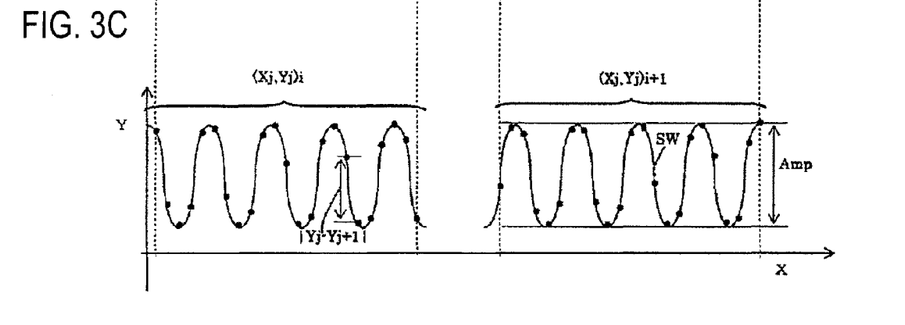
Figure 4:
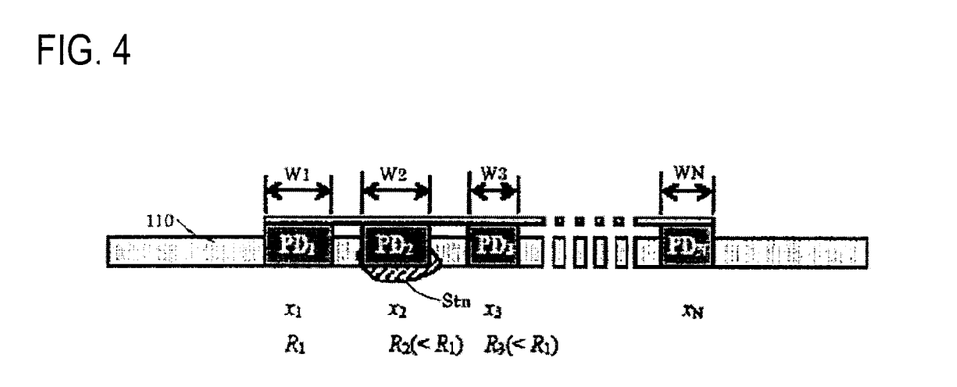
FIG. 4 is a diagram showing a case where contamination or the like is on a scale.

An encoder of a first embodiment of the invention will be described with reference to FIGS. 1 to 4. FIG. 1 schematically shows the encoder 100 of the embodiment, FIG. 2A shows arrangement of light receiving array portions PDi (in the figure, i=1 to 4) in a surface of a detection head 120 which is opposed to a track 112, FIG. 2B is a block diagram of the detection head 120, FIG. 3A shows arrangement of optical gratings 114 constituting the track 112, FIG. 3B shows light receiving array portions PDi, PDi+1 opposed to the track 112, FIG. 3C shows signal strengths (each indicated by a solid circle) which are output from individual light receiving elements constituting the light receiving array portions PDi, PDi+1, and a curve SW which is obtained by using the sinusoidal curve fitting, and the like, and FIG. 4 is a diagram showing relationships between the scale and the light receiving array portions in the case where contamination or the like is on the scale.

First, the configuration of the encoder 100 of the embodiment will be described.

The encoder 100 is a linear encoder, and, as shown in FIG. 1, includes the scale 110, and the detection head 120 which is relatively displaceable with respect to the scale 110.

In the scale 110, as shown in FIG. 1, the track 112 which extends in the X direction (the direction along which the head is relatively displaceable) is disposed. The track 112 is configured by the optical gratings 114 which are arranged in the X direction at constant intervals (the track is an INC track in which an INC pattern is formed). Light is reflected from portions where the optical gratings 114 are formed (FIGS. 3A, 3C).

As shown in FIG. 1, the detection head 120 is placed while being opposed non-contactly to the track 112 of the scale 110. The detection head 120 includes: a light source (not shown); a lens (not shown); and the light receiving array portions PDi (i=1 to 4) (detection array portions) which, as shown in FIG. 2A, are arranged in the X direction in the surface opposed to the track 112. The components are arranged so that light emitted from the light source is reflected by the optical gratings 114 of the track 112 and then detected by the plurality of light receiving array portions PDi through the lens.

The light receiving array portions PDi have respective array widths Wi (i=1 to 4), and intervals T are formed between the portions (in the embodiment, the intervals T are constant, but may be different from one another). Each of the light receiving array portions PDi is configured by a plurality of light receiving elements which are arranged in the X direction. In the embodiment, the widths of all the light receiving elements in the X direction are equal to one another, and the numbers of light receiving elements constituting the respective light receiving array portions PDi are equal to one another. Therefore, all the array widths Wi are made equal to one another.

As shown in FIG. 2B, the detection head 120 includes, in addition to the light receiving array portions PDi, a noise filter/amplifier circuit 124, an A/D circuit 126, and a processing circuit 128.

The noise filter/amplifier circuit 124 removes noises of signals output from the light receiving array portions PDi, and then amplifies and outputs the signals.

The A/D circuit 126 converts the analog output signal which is output from the noise filter/amplifier circuit 124, to a digital signal.

The processing circuit 128 calculates the position signal xi indicating the position x of the detection head 120, for each of the light receiving array portions PDi from the digital signal (the output signal output from the light receiving array portion PDi) (in principle, all the position signals xi indicate the same position). Then, the processing circuit 128 combines the plural (four) obtained position signals xi with one another, and determines the position x of the detection head 120 with respect to the scale 110. In order to determine the position x of the detection head 120, a coefficient Ri (referred to as a reliability coefficient) indicated in Expression (1) is introduced. The reliability coefficient Ri performs weighting according to the level of the output signal output from each of the light receiving array portions PDi, on the position signal xi of the light receiving array portion PDi. The position x of the detection head 120 is obtained from the average of the weighted position signals xi. In the embodiment, the symbol N indicates the number (4) of the light receiving array portions PDi.

[Exp. 1]

$$x = \frac{\sum_{i=1}^{N} Ri * xi}{\sum_{i=1}^{N} Ri} \quad (1)$$

In the embodiment, the reliability coefficient Ri is obtained from Expression (2). Namely, the signal intensity (output signal) of the j-th light receiving element in the light receiving array portion PDi is indicated by $Y_{i,j}$, and the number of data obtained in the light receiving array portion PDi is indicated by ni (i=1 to 4). As shown in the left view of FIG. 3C, the absolute value ($=|Y_{i,j}-Y_{i,j+1}|$) of the difference between adjacent data is obtained from data of the signal intensities $Y_{i,j}$ of output signals output from individual light receiving elements constituting the light receiving array portion PDi. When the total sum of the values in the light receiving array portion PDi is obtained, the reliability coefficient Ri is obtained. This means that, when the contrast of a one-dimensional image of the track 112 obtained by the light receiving array portion PDi is large, the reliability coefficient Ri is large, or in other words the reliability is high.

[Exp. 2]

$$Ri = \sum_{j=1}^{ni-1} |Y_{i,j} - Y_{i,j+1}| \qquad (2)$$

Next, the operation of the encoder 100 of the embodiment will be described.

Light emitted from the light source of the detection head 120 impinges on the scale 110. Then, the light is reflected by the optical gratings 114 of the scale 110, and incident on the light receiving elements of the light receiving array portions PDi of the detection head 120. The light receiving array portions PDi perform an output operation corresponding to the intensities of light incident on the light receiving elements. The outputs of the portions are supplied to the processing circuit 128 through the noise filter/amplifier circuit 124 and the A/D circuit 126.

The processing circuit 128 calculates the position signal xi indicating the position x of the detection head 120, for each of the light receiving array portions PDi. By using the relationships of Expressions (1) and (2), then, the plural (four) obtained position signals xi are combined with one another, and the position x of the detection head 120 with respect to the scale 110 is determined.

In the embodiment, in order to determine the position of the detection head 120, as described above, the reliability coefficient Ri is introduced, thereby allowing the contribution rate in the combining of the position signals xi obtained from each light receiving array portion PDi, to be controlled. Schematically, when the array widths of the light receiving array portions PD1 and PD2 are equal to each other (W1=W2) as shown in FIG. 4, the reliability coefficient R2 of the light receiving array portion PD2 to which dirt Stn adheres is smaller than the reliability coefficient R1 of the light receiving array portion PD1 (incidentally, when dirt does not adhere to both the opposing surfaces of the light receiving array portions PD1, PD3 of the scale 110 and the array width W3 is shorter than the array width W1, the reliability coefficient R3 is lower than the reliability coefficient R1 as shown in FIG. 4). In the combining of the position signals, namely, the contribution rate of a position signal xi having a low reliability is lowered, and that of a position signal xi having a high reliability is increased, whereby the position signals xi are efficiently combined with each other. In other words, even in a state where contamination or the like adheres to the scale 110, the detection accuracy of the obtained position x of the detection head 120 can be suppressed from being reduced, and the accuracy (reliability) of the position x can be improved.

In the embodiment, when the contrast of a one-dimensional image of the track 112 obtained by the light receiving array portions PDi is large, therefore, it is determined that the reliability is high, and the reliability coefficient Ri is introduced. At this time, the reliability coefficient Ri is indicated by a simple computational expression as shown in Expression (2), and hence the calculation is simple and does not require a large storage capacity, so that the calculation can be realized in a short processing time and at a low cost. Even when the reliability coefficient Ri is indicated by the total sum of square values of differences of adjacent signal intensity data for each detection array portion PDi as indicated by Expression (3), similar effects are attained.

[Exp. 3]

$$Ri = \sum_{j=1}^{ni-1} (Y_{i,j} - Y_{i,j+1})^2 \qquad (3)$$

In the embodiment, moreover, the position x of the detection head 120 is obtained from the weighted average of the position signals xi. Basically, only the contribution rate of each position signal xi obtained from the light receiving array portion PDi is changed, and an operation of daringly eliminating a specific position signal xi is not performed. In the embodiment, therefore, it is not required that, as in the prior art, the detection head is elongated in the direction (X direction) along which the head is relatively displaceable so that a larger number of light receiving array portions PDi are disposed. Consequently, the detection head 120 can be maintained compact.

In the embodiment, the above-described weighted average is used. Therefore, the contribution rate of the position signal xi from the light receiving array portion PDi related to a region where dirt adheres to the scale 110 is changed only in relative relationships with respect to the output signal from another light receiving array portion PDi. When all the light receiving array portions PDi are related to the region to which dirt adheres, namely, a large difference is not produced between the contribution rates of the position signals xi. In the embodiment, when the position x of the detection head 120 is to be obtained, therefore, there is no case where the position signal xi based on the output signal is eliminated, and an error stop can be avoided from being caused in a controlling machine to which the encoder 100 is attached.

Usually, a controlling machine to which an encoder is attached requests the encoder to output the position x of a detection head at constant intervals. In the related art, when, in a scale, different signal processing times are used in a region to which contamination or the like adheres, and another region to which contamination or the like does not adhere, therefore, there is a possibility that a disadvantage such as a malfunction in the positioning of the controlling machine may be caused in the control. In the embodiment, by contrast, the process indicated by Expressions (1) and (2) (or (1) and (3)) is performed on the scale 110 and in a region to which contamination or the like adheres, and another region to which contamination or the like does not adhere. In the embodiment, namely, the signal processing load is constant, and the signal processing time for obtaining the position x of the detection head 120 is uniformalized. In the embodiment, therefore, it is possible to easily avoid the disadvantage in the positioning control of the controlling machine.

According to the embodiment, even when contamination or the like adheres to the scale 110, the detection accuracy can be suppressed from being reduced, the detection head 120 can be maintained compact, and an error stop can be avoided from being caused in a controlling machine to which the encoder 100 is attached.

Although the invention has been described by exemplifying the first embodiment, the invention is not limited to the first embodiment. It is a matter of course that improvements and design changes can be made without departing the spirit of the invention.

In the first embodiment, for example, the processing circuit 128 uses the function indicated by Expression (2) as the reliability coefficient Ri. The invention is not limited to this. For example, the invention may be configured as a second embodiment which will be described below. In the embodiment, the function indicated by Expression (4) is used as the reliability coefficient Ri. As shown in the right view of FIG. 3C, the sinusoidal curve fitting SW is performed on data of signal strengths of the output signals which are output from individual light receiving elements constituting the light receiving array portions PDi, and the product of the amplitude Amp of the sinusoidal wave obtained by the fitting, and the array width Wi of the detection array portion PDi is used as the reliability coefficient Ri.

[Exp. 4]

$$Ri = Wi*Amp = Wi*\frac{2}{ni}\sqrt{\left(\sum_{j=1}^{ni} Y_{i,j}*\sin X_{i,j}\right)^2 + \left(\sum_{j=1}^{ni} Y_{i,j}*\cos X_{i,j}\right)^2} \quad (4)$$

In the embodiment, when the amplitude Amp obtained in the fitting is large and the array width Wi is large, as described above, the reliability of the position signal xi is made high, and the reliability coefficient Ri is introduced. Even when an error occurs in the output signal, namely, the error can be averaged by performing the process called fitting, and therefore the detection head 120 can be accurately positioned.

Alternatively, the invention may be configured as a third embodiment which will be described below. In the embodiment, Expression (5) is used as the reliability coefficient Ri. In the embodiment, a conventional two-phase sinusoidal signal is used as the output signal obtained in the processing circuit 128. In the light receiving array portion PDi, light receiving elements are arranged so as to produce outputs which are different in phase by 90 degrees from each other. Then, the product of the array width Wi of the light receiving array portion PDi, and the diameter ri of a Lissajous waveform Lsj of FIG. 5 which is obtained from the two-phase sinusoidal signal that is an output signal output from the light receiving array portion PDi is set as the reliability coefficient Ri.

[Exp. 5]

$$Ri = Wi*ri \quad (5)$$

Figure 5:
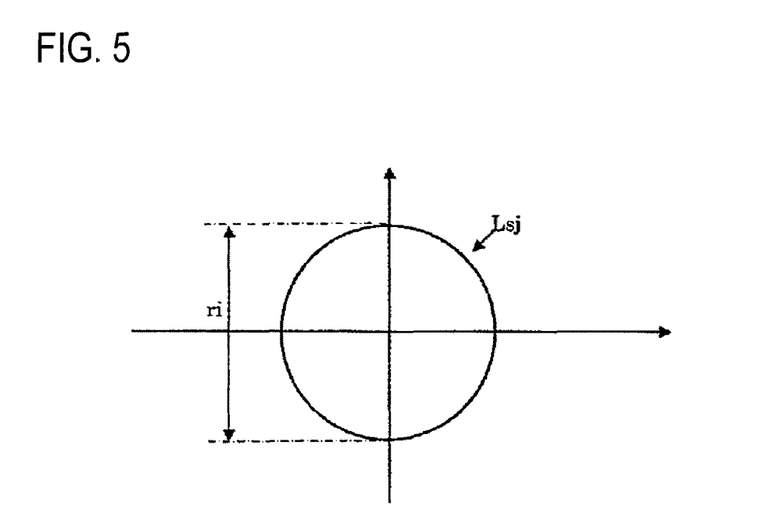
FIG. 5 is a view showing an example of a Lissajous waveform according to a third embodiment of the invention.

In the embodiment, therefore, the reliability of the position signal xi is high when the diameter ri of the Lissajous waveform Lsj is large and the array width Wi is large, and hence the same effects as those in the above-described embodiments are attained. In the embodiment, moreover, the Lissajous waveform Lsj is used in the same manner as the prior art, and hence the change of the of the process contents of the processing circuit 128 can be made minimum, so that particularly the development period can be shortened.

Figure 6:
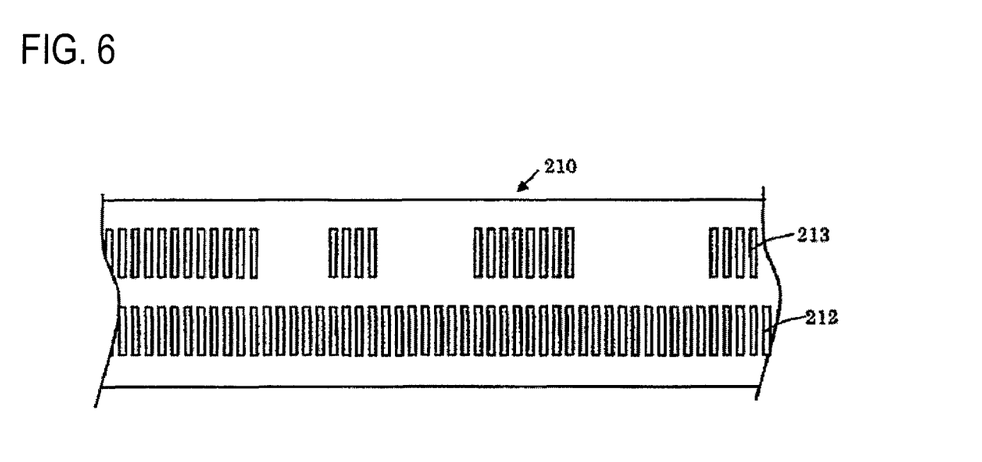
FIG. 6 is a view showing an example of a scale according to a fourth embodiment of the invention.

In the above-described embodiments, the invention is applied to an INC pattern in which optical gratings are arranged at regular intervals. The invention is not limited to this. The invention particularly exerts the effects in the case where a periodical output signal can be obtained from the light receiving array portions PDi such as the case where the invention is applied to the INC pattern of the scale 110, or namely the case where a track on a scale has optical gratings which are arranged at constant intervals (the track has an INC component). Therefore, any of the relationships indicated by Expressions (2) to (5) can be applied to an integrated pattern 213 which is shown in a fourth embodiment shown in FIG. 6, and which is configured by an ABS pattern based on a pseudorandom code, and an INC pattern (FIG. 6 of JP-A-2009-2702). Also with respect to the integrated pattern, reduction of the detection accuracy can be suppressed, the detection head can be maintained compact, and an error stop can be avoided in a controlling machine to which the encoder is attached. The scale 210 shown in FIG. 6 is formed by an integrated pattern 213 and an INC pattern 212.

Figure 7:
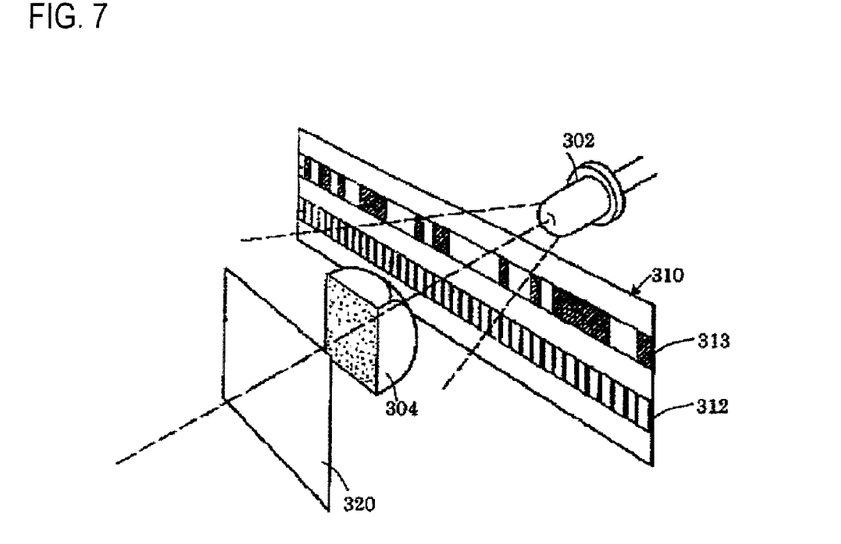
FIG. 7 is a view showing an example of a scale and the like according to a fifth embodiment of the invention.

The invention may be applied not only to a reflection type encoder which is shown in the embodiments, but also to a transmission type encoder such as shown in FIG. 7. The transmission type encoder shown in FIG. 7 includes a light source 302, a scale 310 on which an INC pattern 312 and an integrated pattern 313 are formed, a lens 304 and a detection head 320.

Figure 8:
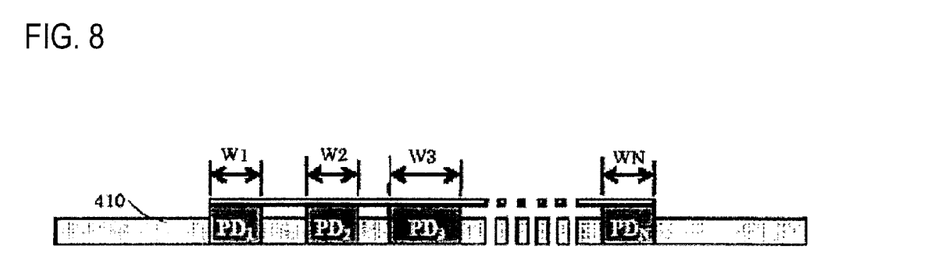
FIG. 8 is a view showing an example of a relationship between a scale and a light receiving array portions according to a sixth embodiment of the invention.
Figure 9:
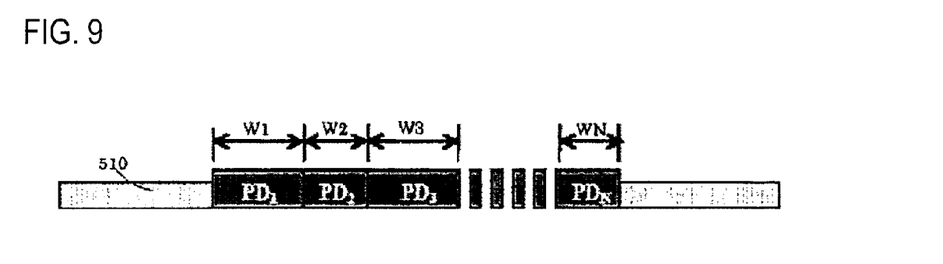
FIG. 9 is a view showing an example of a relationship between a scale and a light receiving array portions according to a seventh embodiment of the invention.

In the embodiments, the array widths Wi of the light receiving array portions PDi are equal to one another, and the intervals T of the light receiving array portions are equal to one another. The invention is not limited to this. As in a sixth embodiment shown in FIG. 8, for example, the array widths Wi may be different from one another, or the intervals may be different from one another. As in a seventh embodiment shown in FIG. 9, moreover, a plurality of light receiving array portions PDi may be disposed by dividing a large light receiving array which is integrally continuous, without forming gaps between the portions. In FIG. 8 and FIG. 9, the reference numbers 410, 510 indicate scales, respectively.

Figure 10:
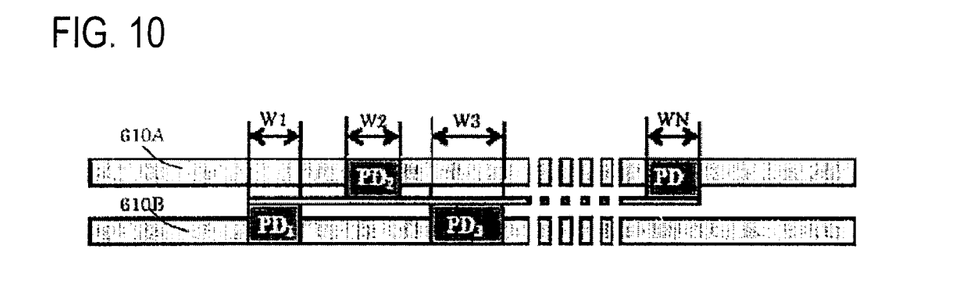
FIG. 10 is a view showing an example of a relationship between a scale and a light receiving array portions according to an eighth embodiment of the invention.

In the embodiments, one scale is placed for one detection head. The invention is not limited to this. As in an eighth embodiment shown in FIG. 10, for example, two scales 610A, 610B may be used as measurement objects. In this case, the position x of the detection head is obtained from each of the scales 610A, 610B, and therefore yawing correction or the like may be performed on the detection head depending on the difference of the two positions.

The embodiments have been described by using the photoelectric (linear) encoder including the linearly-shaped scale. The invention is not limited to this. For example, the encoder must be configured so that the detection head has a plurality of detection array portions including a plurality of detection elements. Therefore, a capacitance type encoder or an electromagnetic induction type encoder may be used. Similarly, the scale is not limited to be linear, and the invention may be applied to a rotary encoder in which a scale has a disk-like shape, and a track is disposed in the circumferential direction of the scale.

According to the encoder of the invention, the detection head can be maintained compact, and occurrences of an error stop can be reduced in a controlling machine to which the encoder is attached. Therefore, the invention can be widely applied not only to a photoelectric encoder, but also to capacitance type and electromagnetic induction type linear encoders, and a rotary encoder.

What is claimed is:

1. An encoder comprising:
a scale; and
a detection head which is relatively displaceable with respect to the scale, wherein the detection head includes
a plurality of detection array portions that are arranged in a direction along which the detection head is relatively displaceable, each detection array portion comprising a plurality of detection elements,
a processor configured to calculate position signals indicating a position of the detection head from output signals output from the detection array portions, and to combine the position signals with one another and determine the position of the detection head with respect to the scale, and
wherein the processor is configured to perform weighting of each position signal calculated by the processor according to a level of the output signal from the detection array portions, and to average the weighted position signals of each of the detection array portions.

2. The encoder according to claim 1, wherein the weighting of each position signal calculated by the processor is performed by setting a coefficient of the position signal to a total sum of absolute values of differences of adjacent ones of signal strength data of output signals output from individual detection elements constituting the detection array portions, or square values of the differences.

3. The encoder according to claim 1, wherein the weighting of each position signal calculated by the processor is performed by performing sinusoidal curve fitting on signal strength data of output signals output from individual detection elements constituting the detection array portions, and setting a coefficient of the position signal to a product of an amplitude of a sinusoidal wave obtained by the fitting, and an array width of the detection array portions.

4. An encoder according to claim 1, wherein the weighting of each position signal calculated by the processor is performed by setting a coefficient of the position signal to a product of a diameter of a Lissajous waveform obtained from a two-phase sinusoidal signal which is an output signal output from an individual detection element, and an array width of the detection array portions.

* * * * *